Patented Oct. 21, 1941

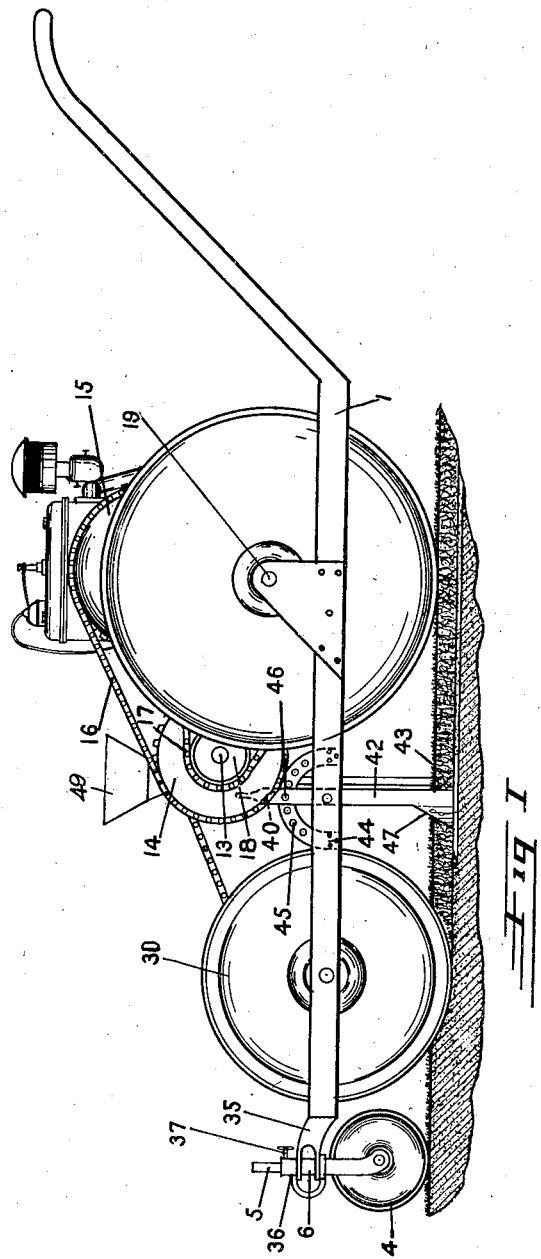

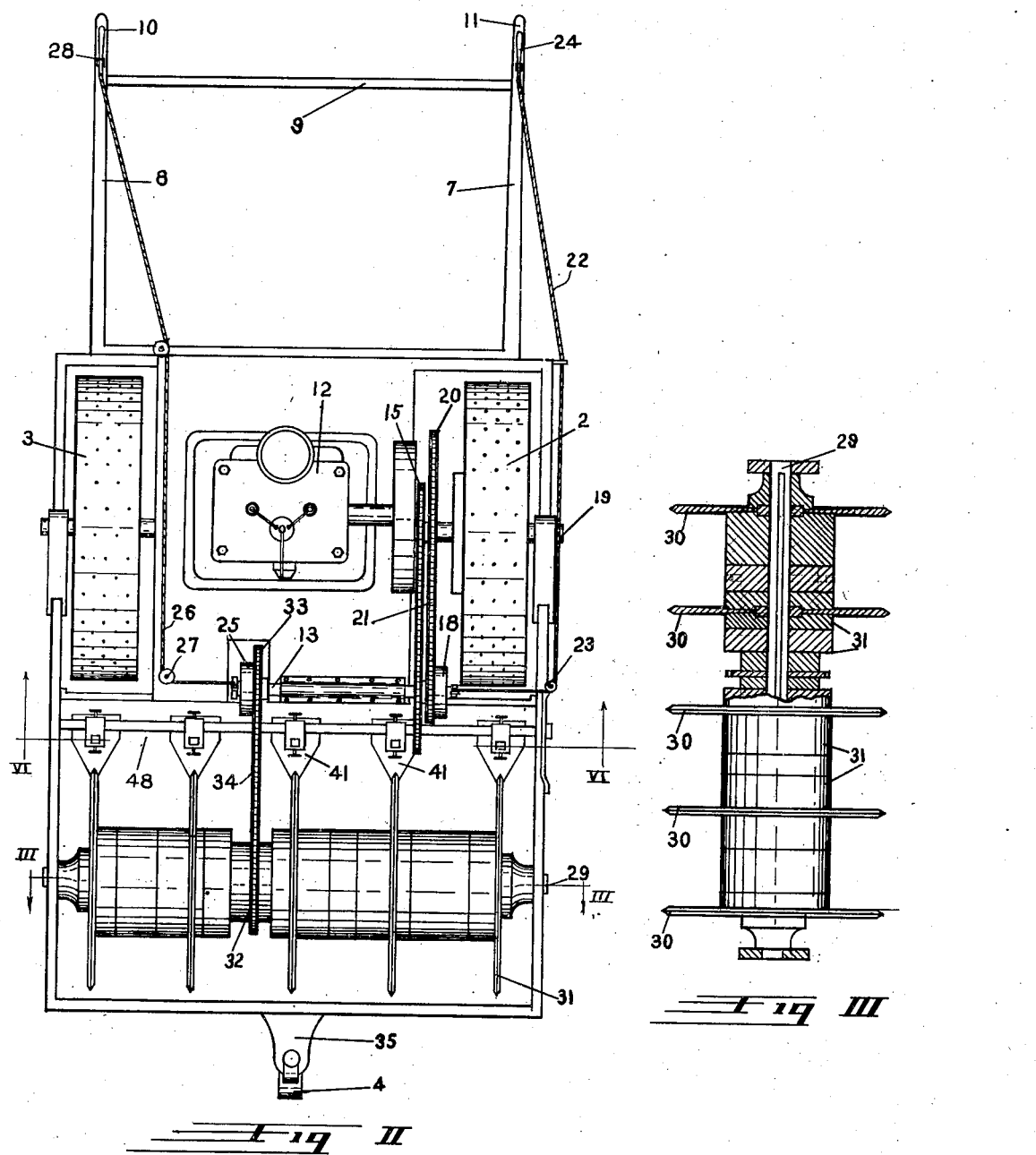

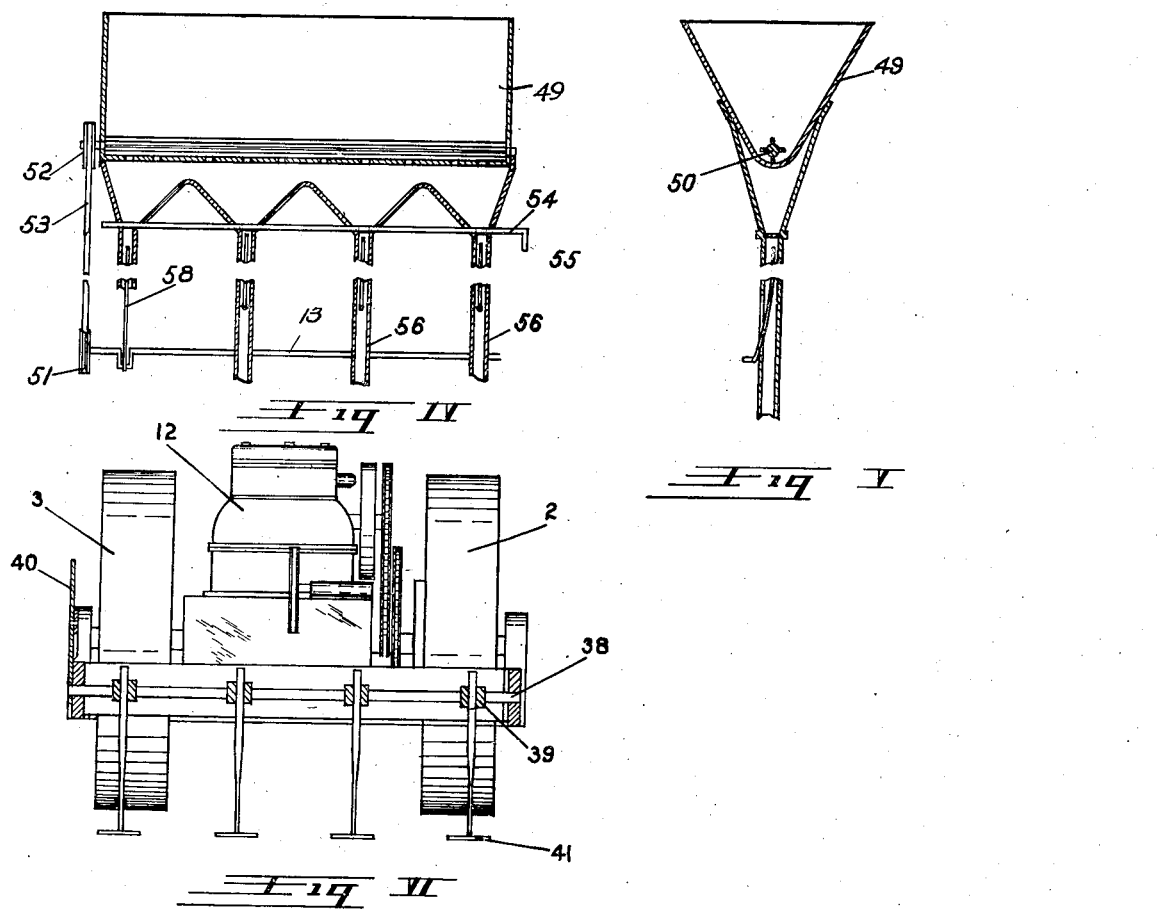

2,260,110

UNITED STATES PATENT OFFICE 2,260,110

DEVICE FOR LAWN DEVELOPMENT

Sophus T. Blohm, Portland, Oreg.

Application June 5, 1939, Serial No. 277,399

4 Claims. (Cl. 111—1)

My invention relates to machines for the treating and conditioning of lawns and turfs.

The purpose of the machine is to sub-aerate and root prune the turf or lawn to admit plant food, fertilizers, sand, and the like into the lawn and at the roots of the lawn grass.

Through the use of my new and improved device, the ground is loosened at the grass roots and it is slitted at spaced intervals in order that the pruning and sub-soiling blades may be run at a predetermined space below the surface of the lawn.

The primary purpose and object of my invention is to provide a simply constructed device that is power operated that may be used in the sub-soiling a lawn already in existence and one in which the roots may be pruned and the lawn be fertilized from below the surface to increase the penetration of the roots of the lawn and to cause a deeper growth of the root structure of the lawn.

A further object of my invention is to provide a simply constructed device. One that may be operated by the ordinary gardener or lawn attendant. One that is comprised of a few parts and one that will have a long and useful life with practical freedom from operating mechanical annoyances.

A still further object of my invention is to provide a device that may be used in slitting the lawn at spaced intervals and one in which the roots may be pruned and the lawn fertilized and aerated below the top surface of the lawn.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. I is a side view of the assembled device illustrating the same in use in the treating of a lawn.

Fig. II is a plan view of the assembled device, with the hopper omitted.

Fig. III is a plan view, partially in section, of the shaft, the spacing collars disposed thereupon, and a sectional view of the discs disposed thereupon the shaft and between the collars.

Fig. IV is a fragmentary sectional rear view of the hopper and of the chutes leading therefrom. The purpose of which is to deliver materials below the surface of the lawn and adjacent the rear of the discs.

Fig. V is a sectional end view of the mechanism illustrated in Fig. IV.

Fig. VI is a fragmentary sectional rear end view of the assembled device. This view is taken on line 6—6 of Fig. II looking in the direction indicated.

Like reference characters refer to like parts throughout the several views.

My device is primarily comprised of any suitable chassis or frame 1. The frame 1 is supported upon a pair of supporting or driving wheels 2 and 3 and upon a tiller or pilot wheel 4. The pilot wheel 4 has a bifurcated stem 5 upwardly extending therefrom that passes through any suitable bearing 6. Side bars 7 and 8 rearwardly extend from the frame and a cross bar 9 secures the same together.

Handles 10 and 11 terminate at the rear ends of the side bars 7 and 8.

A prime mover, as an internal combustion engine, 12 is mounted upon the chassis and a jack shaft 13 is supported within the frame and the jack shaft has a sprocket wheel 14 mounted thereupon. A sprocket 15 is mounted upon the driving shaft of the prime mover and a driving element 16, as a chain, is trained about the respective sprockets 14 and 15. A sprocket 17 is mounted upon the jack shaft 13 and a clutch 18 is also mounted upon the shaft 13 so that the prime mover may be run without imparting mobility to the assembled device when the clutch 18 is disengaged from the sprocket 17. The clutch 18 may be of the conventional type, as a cone clutch, or as a disk clutch, with the clutch normally held in contact with the sprocket 17 through the conventional spring action. Since no specific claim is made for the driving relationship between the clutch and the sprocket, the details of construction are not shown.

A shaft 19 is suitably journaled within the frame upon which the respective driving wheels 2 and 3 are mounted and a sprocket 20 is mounted upon the shaft 19 and a driving chain 21 is trained about the respective sprockets 17 and 20 so that when the clutch 18 is engaged and the prime mover is running, the driving wheels 2 and 3 will be rotated.

A pull cable 22 is secured to the clutch 18 and the same is trained about a shrouded pulley 23 and an operating lever 24 is mounted upon one of the side bars 7 and 8 and terminates adjacent one of the handles so that the operator of the device, when standing at the handle controls, may manipulate the clutch 18 into and out of driving relationship with the sprocket 17.

A second clutch 25 is mounted upon the jack shaft 13 and a cable 26 is trained about a shrouded pulley 27. The cable 26 terminates in a pull lever 28 associated with the handle 10 so that the clutch 25 may be actuated into and out of operating position. The clutch 25 is of the conventional type, as a cone clutch or a disk or plate clutch, and the same cooperates with and drives a sprocket 33 and driving relationship is maintained between the sprocket 33 and the clutch 25 by a spring. Since no claim is to be made on the specific relationship developed between the clutch 25 and the sprocket 33, the details of construction are not shown.

A disc shaft 29 is journaled within the side frames and a plurality of spaced discs 30 are mounted upon the shaft 29. The spacing of the discs may be varied by the placing of spacing collars 31 upon the shaft and between the respective discs.

In order that the discs may be suitably rotated and develop a minimum amount of power for rotation, I have found best results are to be obtained where the discs are hollow ground on their respective sides so that, as the discs are operated through the lawn, the friction of rotation will be lessened.

A sprocket 32 is mounted upon the shaft 29 and a sprocket 33 is mounted upon the shaft 13 and a driving element, as a chain, 34 is trained about the respective sprockets so that, when the clutch 25 is engaged, the shaft 29 will be rotated and the discs 30 will also be rotated.

The depth of the penetration of the discs 30 beneath the surface of the lawn is predetermined by the position of the yoke 35 relative to the bifurcated stem 5.

A positioning clevis 36 is disposed upon the stem and at either side of the yoke 35 so that the front end of the frame may be raised and lowered relative to the stem and thereby control the depth of penetration of the discs 31 within the lawn. The clevis is fixedly positioned relative to the stem by a set screw 37.

A sub-soiler blade 41 follows each of the discs. A supporting shaft 38 is provided for the supporting of the sub-soiler shanks 42 and blades 41 and a plurality of supporting blocks 39 are disposed upon the shaft 38 with the blocks adapted for being adjusted longitudinally of the shaft 38 to aline them with the different spacing of the discs 30 at any desired depth and to permit the raising and lowering of the sub-soiler blades 41. It is desired that the blade 41 follow substantially at the depth to which the disks penetrate and to cut a slit within the lawn adjacent either side of the slit formed by the respective disks. As the disks are raised and lowered through adjustment of the clevis 36 heretofore described, it is necessary also to adjust the shanks 42 with the block 39.

A hand adjusting lever 40 is secured to the shaft 38 which permits the partial rotation of the shaft 38 to thereby tilt the sub-soiler blades 41 to the horizontal.

Each of the sub-soiler blades is mounted upon a shank 42 and the shanks 42 are raised or lowered within the block 39 to predetermine the depth of penetration of the blades below the surface 43 of the lawn.

A quadrant 44 is secured to the frame and the adjusting lever 40 is moved relative to the quadrant and a plurality of spaced holes 45 are disposed within the quadrant and a positioning pin 46 is placeable through the adjusting lever 40 and into the holes 45 to thereby determine the tilt from the vertical of the respective shanks 42.

The front edge 47 of the shank is sharpened in order that it may follow within the slit made within the lawn by the respective discs 30.

I have found best results are to be obtained where the width of the blades 41 leaves a space 48 between the adjacent edges of the blades substantially the width of the respective blades themselves. This arrangement of the width of the blades leaves a spacing of the lawn in which substantially one-half of the root area is left unpruned or uncut and untreated. This pruning of the roots of the lawn grass leaves the humus of the cut portion of the roots as feeder material for a new root growth and also prevents the scalping of the lawn so that best results and satisfactory results are obtained by this procedure.

I have also found that the depth of the blade 41 is determined by the species of lawn grass being grown. One inch in depth may be sufficient for certain characters of lawn and certain soil conditions whereas two inches give best results for other species of lawn or grass and other soil conditions.

The discs 31 form slits in the lawn in parallel strips. The shank 42 follows within the slits thus formed and, in order that fertilizer material may be fed to the roots of the lawn being treated, I place a hopper 49 transversely of the machine and I provide a power driven feeder shaft 50 within the base of the hopper.

The feeder shaft 50 is driven by the placing of a sprocket 51 upon the jack shaft 13 and by the placing of the sprocket 52 upon the shaft 50 and a suitable driving element, as a chain, 53 is trained about the respective sprockets 51 and 52.

A cut off blade 54 is provided that is manually settable by providing a lever 55 upon one of its ends and a plurality of chutes 56 downwardly extend from the base of the hopper into which the material to be fed into the slits flow. The movement of the blade regulates the flow of material from the hopper into the respective chutes.

In order to provide an agitator within each of the chutes, I provide agitating wires or rods 58 upon the shaft 13. The shaft 13 has crank portions as shown in Figure 4 associated with the wires or rods so that as the shaft 13 is rotated, the members 58 will be reciprocated. The materials, as fertilizer, sand, or other materials, flow through the chutes and are deposited within the respective slits and within the aerated space developed through the action of the cutting blades 41. The quantity of the material so fed is regulated through the action of the lever 55.

A cutting of the spaced slits within the lawn area and the sub-soiling of the same below the surface 43 of the lawn prunes the roots of the lawn grass, aerates the lawn area below its surface, permits the placing of fertilizer below the surface of the lawn so that the roots for food grow downward in tendency whereas fertilizer material that is placed upon the surface of the lawn does not allow the root structure seeking plant food to penetrate to the depth that they do when a device of the kind disclosed is used.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a frame, a pair of driving wheels supported within the frame and a pilot wheel adjustably and rotatably disposed about a vertical axis disposed at the front end of the frame, handles associated with the frame and rearwardly extending from the frame, a prime mover mounted upon the frame, means for connecting the driving wheels with the prime mover to effect driving relation between the prime mover and the driving wheels, a shaft disposed transversely of the frame, a plurality of disks disposed upon the shaft, means for predetermining the spaced relation of the respective disks upon the shaft, a plurality of shanks mounted within the frame and each adapted for being positioned rearwardly of one of the disks, a subsoiler blade disposed at the lower end of each of the shanks, means common to each of the shanks for inclining each of the shanks to the vertical and each of the blades to the horizontal, and a hopper having a plurality of chutes depending from the hopper, and one of the chutes being associated with each of the shanks and terminating at the lower end of the shank and adapted for depositing material at the rear of each of the subsoiler blades.

2. In a device of the class described, in combination, a power driven wheel supported vehicle, means for predetermining the distance of the under side of the front end of the vehicle from the ground, a plurality of hollow ground disks mounted upon a common shaft, means for power rotating the shaft, means for predetermining the spaced relation to be maintained between the disks, a shank rearwardly disposed relative to each of the disks, with the front of the base end of each of the shanks being sharpened, a subsoiler blade disposed at the bottom end of each of the shanks, means for inclining each of the shanks to the vertical and for inclining each of the subsoiler blades to the horizontal, and means carried by the vehicle for depositing lawn feeder material at the location of the cutter blades and below the top surface of the lawn.

3. In a device of the class described, the combination of a self-propelled wheel supported vehicle, a plurality of power driven disks mounted within the frame of the vehicle, manually settable means for predetermining the spaced relation of the disks, means for regulating the depth of the cut of the disks, a shank carrying a subsoiler blade trailing each of the disks with the subsoiler blade positioned to slit the ground at the depth of penetration of the disks within the ground, and means for feeding material at the trailing end of each of the cutter blades.

4. In a device of the class described, in combination, a wheel supported self propelled vehicle, means for adjusting the height of the front end of the vehicle from supporting surface of a lawn, a plurality of spaced disks rotatably mounted within the frame, and a shank disposed rearwardly of each of the disks, with the shank being positioned to trail within the slit made by the disk disposed immediately in the front thereof, and a blade disposed at the base end of each of the shanks, and the adjacent edges of each of the blades being spaced apart so that portion of the root area of the lawn will remain uncut, and means for delivering plant food within the wake of each of the blades.

SOPHUS T. BLOHM.